United States Patent

Micka et al.

[11] Patent Number: 6,148,383
[45] Date of Patent: Nov. 14, 2000

[54] STORAGE SYSTEM EMPLOYING UNIVERSAL TIMER FOR PEER-TO-PEER ASYNCHRONOUS MAINTENANCE OF CONSISTENT MIRRORED STORAGE

[75] Inventors: William Frank Micka, Tucson, Ariz.; Yoram Novick, Haifa, Israel

[73] Assignee: International Business Machines Corporation, Armonk, N.Y.

[21] Appl. No.: 09/112,896

[22] Filed: Jul. 9, 1998

[51] Int. Cl.[7] .................................................. G06F 12/00
[52] U.S. Cl. ................................ 711/162; 714/12; 714/20
[58] Field of Search .............................. 711/162; 714/12, 714/20, 5, 6, 13

[56] References Cited

U.S. PATENT DOCUMENTS

| | | | |
|---|---|---|---|
| 5,416,808 | 5/1995 | Witsaman et al. | 375/350 |
| 5,510,797 | 4/1996 | Abraham et al. | 342/352 |
| 5,555,371 | 9/1996 | Duyanovich et al. | 714/13 |
| 5,563,607 | 10/1996 | Loomis et al. | 342/357 |
| 5,633,872 | 5/1997 | Dinkins | 370/312 |

OTHER PUBLICATIONS

R. Roze, "Using GPS for Timing ATM Networks," http://ucsub.colorado.edu/~roze/gps–atm.html, May 1, 1995, pp. 1–4.

E. Spivak, "Why Digital Networks Are Better with GPS Synchronizing", http://www.absolutetime.com/edspiv~1.htm, Aug. 28, 1997, pp. 1–7.

*Primary Examiner*—Do Hyun Yoo
*Assistant Examiner*—Mehdi Namazi
*Attorney, Agent, or Firm*—Dan Hubert & Assoc.

[57] ABSTRACT

A data storage system employs a universal timer to perform asynchronous peer-to-peer data mirroring, where primary and secondary controllers cooperatively perform periodic consistency checks according to the universal timer. The system includes multiple primary storage controllers each having a counterpart secondary controller. Primary and secondary controllers access a universal timer, such as a global positioning system (GPS). Each primary controller receives updates, and stores the updates in an order, providing each update with a sequence code according to its storage order. Each primary controller also transmits the updates and corresponding sequence codes to its secondary controller. Each secondary controller receives updates from its counterpart primary storage controller and stores the updates in a journal. Whenever a periodic timer interval of the universal timer expires, several things happen. Each primary controller sends its counterpart secondary controller a confirmation message useful in identifying all updates that were sent in the expired interval. Also, each secondary controller checks for receipt of the confirmation message, and if received, the secondary controller checks the journal for presence of all updates identified by the confirmation message. If each secondary controller finds all identified updates in its journal, all secondary controllers proceed to commit the journaled updates to secondary storage.

22 Claims, 3 Drawing Sheets

STORAGE SYSTEM EMPLOYING UNIVERSAL TIMER FOR PEER-TO-PEER ASYNCHRONOUS MAINTENANCE OF CONSISTENT MIRRORED STORAGE

BACKGROUND OF THE INVENTION

1. Field of the Invention

The present invention relates to backup data storage. More particularly, the invention concerns a digital data storage system using a universal timer to perform asynchronous peer-to-peer data mirroring where primary and secondary controllers cooperatively perform periodic consistency checks according to the universal timer.

2. Description of the Related Art

In this information age, there is more data than ever to transmit, receive, process, and store. And, as people's reliance upon machine readable data increases, they are more vulnerable to damage caused by data loss. Consequently, data backup systems have never been more important.

Generally, data backup systems copy a designated group of source data, such as a file, volume, storage device, partition, etc. If the source data is lost, applications can use the backup copy instead of the original, source data. The similarity between the backup copy and the source data may vary, depending upon how often the backup copy is updated to match the source data. If the backup copy is updated in step with the source data, the copy is said to be a "mirror" of the source data, and is always "consistent" with the source data.

Some competing concerns in data backup systems are cost, speed, and data consistency. Systems that guarantee data consistency often cost more, and operate more slowly. On the other hand, many faster backup systems typically cost less while sacrificing absolute consistency.

One example of a data backup system is the Extended Remote Copy ("XRC") system, sold by International Business Machines Corp. In addition to the usual primary and backup storage devices, the XRC system uses a "data mover" machine coupled between primary and backup devices. The data mover performs backup operations by copying data from the primary devices to the secondary devices. Storage operations in the XRC system are "asynchronous," since primary storage operations are committed to primary storage without regard for whether the corresponding data has been stored in secondary storage.

The secondary device is guaranteed to be consistent with the state of the primary device at some specific time in the past. This is because the XRC system time stamps data updates stored in the primary devices, enabling the secondary devices to implement the updates in the same order. Time stamping in the XRC system is done with a timer that is shared among the hosts coupled to primary storage. As an example, the common timer may comprise an IBM Sysplex Timer, P/N 9037-002. Since the secondary device is always consistent with a past state of the primary device, a limited amount of data is lost if the primary device fails.

A different data backup system is IBM's Peer-to-Peer Remote Copy ("PPRC") system. The PPRC approach does not use a data mover machine. Instead, storage controllers of primary storage devices are coupled to controllers of counterpart secondary devices by suitable communications links, such as fiber optic cables. The primary storage devices send updates to their corresponding secondary controllers. With PPRC, a data storage operation does not succeed until updates to both primary and secondary devices complete. In contrast to the asynchronous XRC system, PPRC performs "synchronous" backups.

Although these systems constitute a significant advance and enjoy widespread commercial success today, the assignee of the present application has continually sought to improve the performance and efficiency of these and other backup systems. Some possible drawbacks of the XRC system include the expense of the data mover, and the lack of complete currency between primary and secondary data storage. Furthermore, any failure of the central data mover is particularly problematic, since this single component is the focal point for all backup operations. In contrast, the PPRC system avoids the expense of the data mover, and the primary and secondary storage devices are completely consistent. However, data backup operations are more time consuming with the PPRC system, since they are synchronous. Moreover, backups take even longer when there is more distance between primary and secondary storage, due to propagation delays in the communications link connecting primary and secondary controllers. For example, fiber optic coupling exhibits a propagation delay of about five microseconds per kilometer of fiber. Electrically conductive materials exhibit a propagation delay of about one nanosecond per foot. Moreover, this propagation delay is doubled for communications in which the primary and backup systems must send and then acknowledge messages.

Consequently, known storage backup systems are not completely adequate for some applications due to certain unsolved problems.

SUMMARY OF THE INVENTION

Broadly, the present invention concerns a data storage system that employs a universal timer to perform asynchronous peer-to-peer data mirroring. Generally, this is achieved by primary and secondary controllers cooperatively perform periodic consistency checks according to the universal timer.

The peer-to-peer backup system of the invention includes a primary storage site and a secondary storage site. There are multiple primary storage sub-sites each having a counterpart secondary storage sub-site. Each sub-site, both primary and secondary, is in communication with a universal timer, such as a global positioning system (GPS). Each primary sub-site receives ordered data updates, and stores the updates at the primary sub-site in that order, optionally time stamping each update to designate its storage time according to the universal timer. Each primary sub-site also transmits the updates and corresponding time stamps to its counterpart secondary sub-site.

Each secondary sub-site receives updates from its counterpart primary storage sub-site and stores the updates to a journal of the secondary sub-site. Whenever a periodic timer interval of the universal timer expires, several things happen. Each primary sub-site sends its counterpart secondary sub-site a confirmation message identifying updates sent in the expired interval. Also in response to the interval expiration, each secondary sub-site checks for receipt of the confirmation message. If no confirmation message has been received, the secondary sub-site takes a predefined action, such as waiting, entering a suspended state, or executing a predefined disaster recovery routine. Only if the confirmation message has been received does the secondary sub-site check the journal for presence of all updates identified by the confirmation message; if present, the secondary sub-site commits the journaled updates to secondary storage.

The primary-to-secondary transmission of updates and corresponding time stamps is also accompanied by a sequence code for each update, representing the order of the update. Thus, each confirmation message identifies updates sent in the expired interval by specifying the sequence code following that of the last transmitted update. When the secondary sub-site checks its journal for presence of all updates identified by the confirmation message, it determines whether the secondary journal contains updates with all sequence codes between the confirmation message and the last confirmation message received by the secondary sub-site.

The primary sub-site may also record all updates in a primary journal. In this embodiment, the secondary sub-site transmits an acknowledge message to the primary sub-site whenever the secondary sub-site commits the journaled updates to secondary storage. In response to the acknowledge message, the primary sub-site releases the updates in its primary journal.

As shown above, then, one aspect of the invention concerns a method to operate a data storage system to perform asynchronous peer-to-peer data mirroring using a universal timer. In another embodiment, the invention may be implemented to provide an apparatus, such as a data storage system, primary site, secondary site, or another component, configured to participate in asynchronous peer-to-peer data mirroring using a universal timer. In still another embodiment, the invention may be implemented to provide a signal-bearing medium tangibly embodying a program of machine-readable instructions executable by a digital data processing apparatus to perform method steps for participation in peer-to-peer asynchronous data mirroring using a universal timer.

The invention affords its users with a number of distinct advantages. For example, the invention achieves fast backups because backups are done asynchronously, without delaying primary storage to wait for storage of updates at the secondary storage. The use of asynchronous backups, as well as the use of separate GPS receivers, also allows backups to be made across long distances. Furthermore, the invention is cost and performance efficient because it performs updates at the peer-to-peer level, avoiding the potential cost and performance bottleneck posed by a central data mover. The invention also enjoys a high level of data consistency, because primary and secondary storage controllers cooperatively perform frequent consistency checks with universal timer to detect loss of in-flight data. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a data storage system using a universal timer to perform asynchronous peer-to-peer data mirroring, where the primary and secondary controllers cooperatively perform periodic consistency checks according to the universal timer.

HARDWARE COMPONENTS & INTERCONNECTIONS

Storage System Structure

Figure 1:
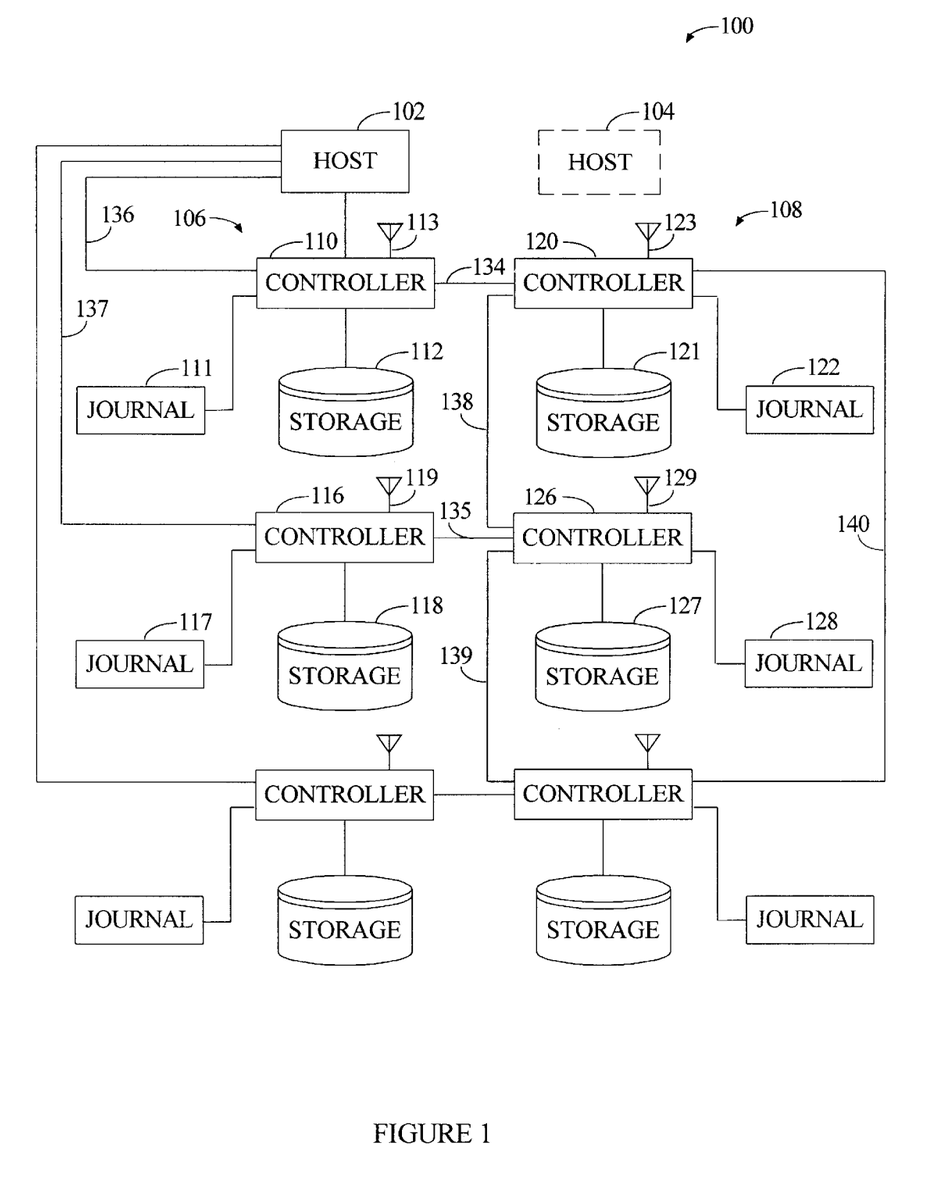
FIG. 1 is a block diagram of the hardware components and interconnections of a data storage system in accordance with the invention.

One aspect of the invention concerns a data storage system, which may be embodied by various hardware components and interconnections as illustrated by the data storage system 100 of FIG. 1. The system 100 maintains primary and redundant backup copies of data to protect against inadvertent data loss, data corruption, disaster, etc.

Generally, the system 100 includes one or more hosts 102, a primary site 106, and a secondary site 108. For ease of illustration, only one primary host 102 is shown. If the primary site 106 experiences a failure of a storage component or communications therewith, the primary host 102 may supervise the secondary site 108 in resurrecting data back to the primary site. Alternatively, if the primary host 102 is failed or otherwise unavailable, a phantom host 104 may be introduced to supervise components of the secondary site 108 in resurrecting secondary data back to the primary site 106.

Primary Site

The primary site 106 includes multiple units of primary storage, such as the storage 112, 118. Each storage may comprise one or more digital data storage devices, such as magnetic disk drives, magnetic or optical tape drives, writable optical media, or other nonvolatile storage. As an example, each storage may comprise multiple storage devices configured as a single "logical" device. Each storage is associated with a primary storage controller, such as the controllers 110 and 116, which corresponds to the storage 112 and 118, respectively. Each controller comprises a digital data processing apparatus such as a custom computing machine, personal computer, computer workstation, mainframe to computer, etc. Each controller may optionally be associated with a primary journal, such as the journals 111, 117 associated with the controllers 110, 116. Each primary journal may be implemented by any suitable writable digital data storage, such as random access memory ("RAM") or another semiconductor memory, magnetic tape, optical media, magnetic disk storage, etc. The journals 111, 117 may even be provided by a file, dataset, partition, or other subpart of the associated storage 112, 118.

Each controller is in communication with a universal clock, which provides a substantially identical time reference signal to all controllers. In the present example, the universal clock is provided by satellite, where each primary controller has a separate global positioning system ("GPS") receiver, such as the receivers 113, 119. As one cost-reducing alternative, one or more primary controllers may have common access to the same GPS receiver through a suitably fast signal distribution system, such as a 1.5 GHz microwave amplifier. For example, GPS signals may be distributed by relatively short cables, short fiber optic lines, wireless transmission over a short distance, etc. As a more specific example, GPS signal distribution may employ a 1.5 GHz microwave amplifier. Each group of components, such as 110–113, makes up a "primary sub-site." As a specific example, each primary sub-site's controller, storage, and journal (e.g. 110, 111, 112) may be provided by an IBM brand RAMAC storage system, which uses magnetic disk drive storage.

Secondary Site

Like the primary site 106, the secondary site 108 includes multiple units of storage, such as the storage 121, 127. Each secondary storage may comprise one or more similar devices as discussed above in the context of the primary storage. Each secondary storage is associated with a secondary storage controller, such as the controllers 120, 126; the controllers may constitute similar machines as the primary controllers, discussed above. Each controller has an associated secondary journal, such as the journals 122, 128; the secondary journals may comprise similar components as the primary journals 111, 117, for example.

Each secondary controller is in communication with the universal clock, which provides the same time reference signal to all primary and secondary controllers. In the present example, where the universal clock is provided by satellite and received by GPS receivers, each secondary controller may have a separate GPS receiver, such as the receivers 123, 129. Similar to the primary site 106, one or more secondary controllers may share access to a common GPS receiver, if desired.

Each secondary controller and its associated components may be called a "secondary sub-site." The secondary sites enjoy inter-controller communications via communications links 138–140. The links may comprise any suitable digital data communications medium, such as wires, signal busses, cables, telephone lines, fiber optic lines, wireless links, computer network (such as local area, wide area, Ethernet, ESCON channel, fiber channel, Internet, Intranet . . . ), etc.

Backup Operations

The host 102 sends the primary sub-sites data records for the primary sub-sites to store on primary storage. The host 102 is coupled to the primary sites by communications links such as 136–137, which may comprise any suitable digital data communications medium, such as wires, signal busses, cables, telephone lines, fiber optic lines, wireless links, computer network (such as local area, wide area, Ethernet, ESCON channel, fiber channel, Internet, Intranet . . . ), etc.

Each secondary controller (and its secondary storage) corresponds to a counterpart primary controller (and its primary storage). A secondary controller, and its secondary storage, serve to mirror the data stored by the counterpart primary controller in its primary storage. For example, the secondary controller 120 updates its storage 121 to replicate the storage 112 of the counterpart primary controller 110. This is a peer-to-peer configuration, because data is exchanged between primary and secondary storage controller peers, rather than a supervising component such as a data mover.

Along with any other possible signals, data records are exchanged between primary and secondary controller counterparts over a communications link. For instance, the communications link 134 enables communications between the primary controller 110 and the secondary controller 120. Similarly, the communications link 135 relays signals between the primary controller 116 and the secondary controller 126. The communications links may be provided by any suitable digital data communications medium, such as wires, signal busses, cables, telephone lines, fiber optic lines, wireless links, computer network (such as local area, wide area, internet . . . ), etc. Advantageously, as discussed in greater detail, the invention permits primary/secondary counterpart controllers to be separated by a substantial intervening distance, while still maintaining the speed and consistency of backup operations.

If a primary storage experiences corruption, disaster, or other data loss, its mirrored secondary storage counterpart is available to help resurrect the primary storage. In this event, host 102 (or the phantom host 104) manages the secondary controllers during operations such as data recovery, data reconstruction, etc. The host 104 is "phantom" since it may be omitted from the system 100 during normal operations, but introduced when data restoration from backup is required and the host 102 is unavailable.

Exemplary Digital Data Processing Apparatus

Another aspect of the invention concerns a digital data processing apparatus, provided to perform the primary or secondary controller functions involved in asynchronous peer-to-peer data mirroring. This apparatus may be embodied by various hardware components and interconnections, and as an example, may be implemented in the primary or secondary controllers shown in FIG. 1.

Figure 2:
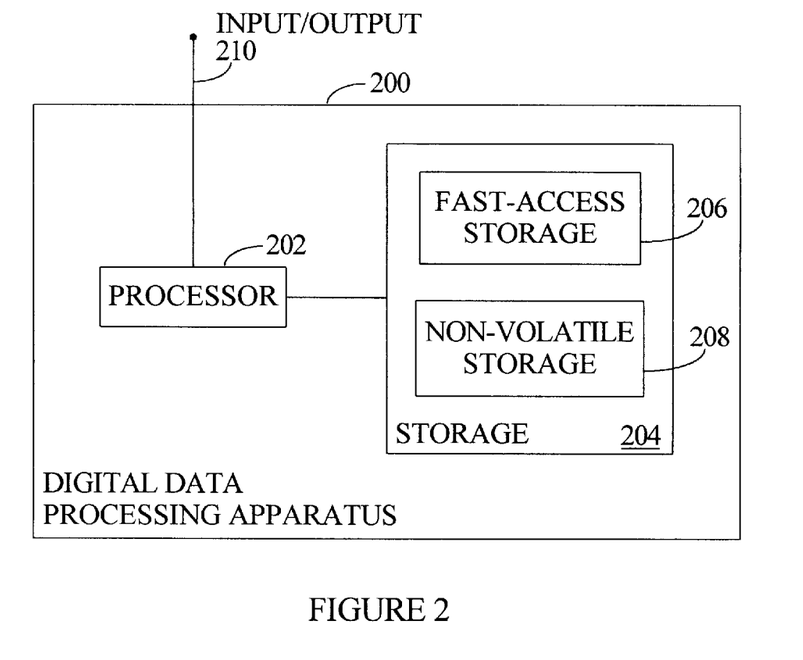
FIG. 2 is a block diagram of a digital data processing machine in accordance with the invention.

As an example of such a digital processing apparatus, FIG. 2 illustrates the apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for operating a data storage system, using a universal timer to perform asynchronous peer-to-peer data mirroring, where primary and secondary controllers cooperatively perform periodic consistency checks according to the universal timer.

Signal-Bearing Media

In the context of FIGS. 1–2, such a method may be implemented, for example, by operating the primary and secondary controllers, each as embodied by a digital data processing apparatus 200 (FIG. 2), to execute certain machine-readable instructions. These instructions may reside in various types of signal-bearing media. In this respect, one aspect of the present invention concerns a programmed product, comprising one or more signal-bearing media, tangibly embodying a program of machine-readable instructions executable by a digital data processor to perform a method to perform the primary or secondary controller functions involved in asynchronous peer-to-peer data mirroring.

Figure 3:
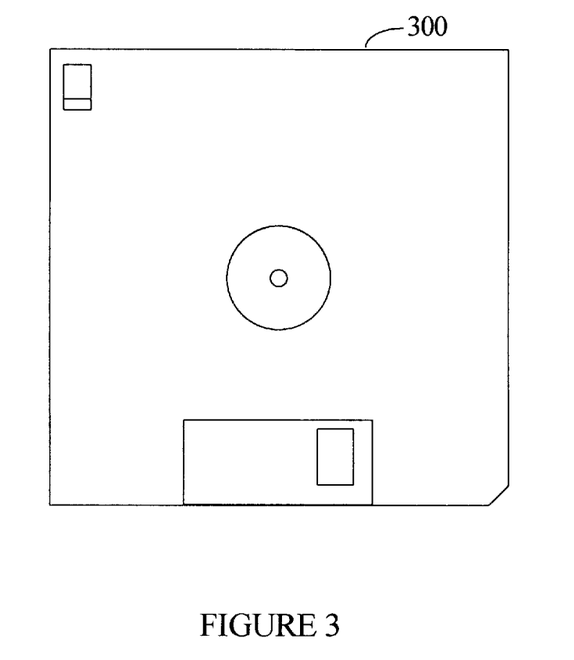
FIG. 3 shows an exemplary signal-bearing medium in accordance with the invention.

This signal-bearing media may comprise, for example, RAM (not shown) contained within a primary or secondary controller, as represented by the digital data processing apparatus 200. Alternatively, the instructions may be contained in another signal-bearing media, such as a magnetic data storage diskette 300 (FIG. 3), directly or indirectly accessible by the respective primary or secondary controller. Whether contained in the primary/secondary controller, RAM, diskette, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Introduction/Setup

Figure 4:
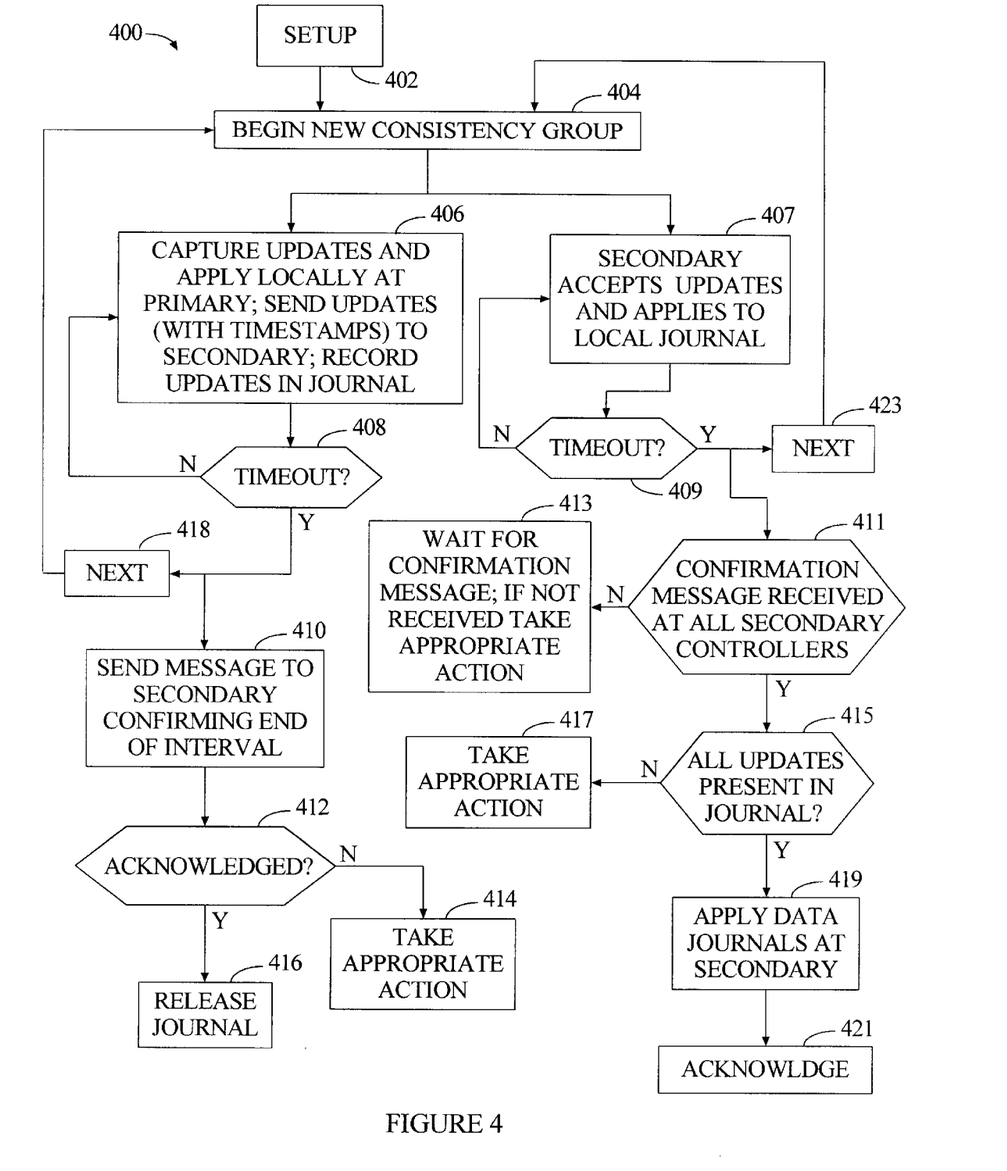
FIG. 4 is a flowchart of an operational sequence for performing data backup operations in accordance with the invention.

FIG. 4 shows a sequence 400 to illustrate one example of the method aspect of the present invention. For ease of explanation, but without any limitation intended thereby, the example of FIG. 4 is described in the context of the data storage system 100 described above and depicted in FIG. 1. The steps are initiated in step 402, which configures the system 100 to begin a particular backup job. Step 402 establishes a time interval to define the length of a "consistency group," as discussed in greater detail below. In the present example, each consistency group has a length of two seconds.

Step 402 also identifies the backup job's source and the target. The source defines storage regions of the primary sub-site's storage. The source region of each primary storage may comprise one or more ranges of storage addresses, physical regions of storage such as "sectors" or tracks, one or more entire physical storage devices, storage "extents," logical devices, etc. In contrast to the source, the backup job's target concerns areas in the storage of the secondary sub-sites where the backup data is actually stored. The target region comprises one or more ranges of storage addresses, physical regions of storage such as "sectors" or tracks, entire physical storage devices, storage "extents," logical devices, etc.

Step 402 is performed by transmitting commands to the primary and secondary storage controllers, which may be accomplished in a number of different ways. As a specific example, step 402 may be performed by a system administrator entering appropriate commands via the host 102, which are transmitted to the primary storage controllers, and from the primary controllers to the secondary controllers. These commands serve to configure, program, or otherwise instruct the primary and secondary controllers to perform the backup job at hand. In addition, step 402 may also perform the function of synchronizing source and target devices before starting the first consistency group.

Starting a Consistency Group

After step 402, step 404 starts backup operations, beginning with a first consistency group. As explained below, each consistency group includes any data records received by the host in a designated time period called a "consistency interval." Consistency groups are used by the primary and secondary sites to ensure consistency between source and target data copies. Consistency groups start and stop periodically, according to a universal timer, which comprises a GPS signal in the example of FIG. 1. Thus, in step 404 the new consistency group starts when the universal timer arrives at a designated time. In this example, a new consistency group begins every two seconds. Advantageously, the universal timer enables both primary and secondary sites to use precisely the same consistency group.

Primary Site Activity

After the new consistency group starts in step 404, the primary site 106 may receive a number of data records. There may be some, many, or no data records, depending upon the activities of the host or other applications using the storage system 100. "Data records" in the present description may comprise bytes, tracks, segments, sectors, disk surfaces, addresses, or any other convenient unit of data. Data records may also be called "updates," since this information contains modifications or additions to data already stored in the primary storage. In step 406, the primary site 106 receives ("captures") data records and locally applies them to primary site storage. In the case of an individual primary controller, step 406 involves receiving data records and applying these data records "locally" to that storage. The primary controller time stamps the data records according to the value of the universal timer at the instant the data record's storage is made effective.

In order to mirror these data records on the secondary site 108, the primary site 106 takes certain actions, also occurring in step 406. Namely, each primary storage controller forwards the data records to the corresponding secondary controller, along with the time stamp and a sequence code. Each sequence code designates that data record's sequence relative to prior data records sent. The sequence code may be a numeric, alphanumeric, alphabetic, or other suitable sequential designation.

Also in step 406, each primary storage controller makes an entry for the data record in its respective primary journal. This record may comprise a pointer or other identification of the region where the data record is stored (e.g., track, byte, page, address, etc.) Alternatively, but more consumptive of storage space, the primary journal may contain the data records themselves. Thus, each primary journal effectively preserves the content of all updates to its corresponding storage device(s) for the purpose of possibly resending the updates to the counterpart secondary controller. As explained below, this may be necessary, for example, if the communications between the primary and secondary controllers experiences a failure, corruption, or other problem.

Table 1 (below) shows an example of the updates, time stamps, and sequence codes transmitted during an exemplary consistency interval.

TABLE 1

Exemplary Consistency Group

| ITEM SENT | TIME STAMP (sec) | SEQUENCE CODE |
| --- | --- | --- |
| update contents | .1 | 2 |
| update contents | .3 | 3 |
| update contents | .7 | 4 |
| update contents | 1.0 | 5 |
| update contents | 1.9 | 6 |

Step 406 continues to run until step 408 determines that a "timeout" has occurred. A timeout occurs at each expiration of each consistency period, e.g., two seconds. When timeout occurs, a number of things happen. One consequence of timeout is the commencement of a new consistency group (step 418 then to step 404). Another consequence of timeout (step 408) is that each primary controller, in step 410, sends a confirmation message to its secondary counterpart confirming the end of a consistency interval. The confirmation message, like the updates, includes a time stamp and a sequence code. When a primary controller sends a confirmation message, this tells the secondary controller that the primary has sent all updates with time stamps and sequence codes earlier than the confirmation message's time stamp and sequence code.

Table 2 (below) shows the consistency group of Table 1, as supplemented by the confirmation message. In this example, the confirmation message occurring at 2.0 seconds (with sequence code seven) tells the secondary controller that the primary controller has sent all updates with time stamps earlier than 2.0 seconds (with sequence codes less than seven).

TABLE 2

Exemplary Consistency Group, With Confirmation Message

| ITEM SENT | TIME STAMP (SEC) | SEQUENCE CODE |
|---|---|---|
| update contents | .1 | 2 |
| update contents | .3 | 3 |
| update contents | .7 | 4 |
| update contents | 1.0 | 5 |
| update contents | 1.9 | 6 |
| confirmation message | 2.0 | 7 |

After sending the confirmation message in step 410, each primary storage controller asks in step 412 whether its respective secondary controller has acknowledged the confirmation message. If the confirmation message is not acknowledged, a problem may have occurred at the secondary site, the communications link between primary and secondary controllers, or the primary site's transmission facilities. Accordingly, the primary controller in step 414 takes appropriate action, such as re-sending the confirmation message, querying the secondary controller, returning an error condition, etc.

On the other hand, if step 412 finds that the secondary controller has properly acknowledged the primary's confirmation message, the primary controller releases its journal entry corresponding to the timed-out consistency group (step 416). Release may involve making the storage where the journal entry is stored available for storing other data, deleting the journal entry, etc.

Secondary Site Activity

Receipt and Application of Updates

Concurrently with the activity of the primary site in steps 406, 408, 410, 412, 414, 416, and 418, the secondary site 108 receives and processes data records from the primary site 106. More particularly, in step 407 each secondary site accepts any updates transmitted by its primary site 106 via the respective communications link, e.g., link 134. Each secondary storage controller also applies these updates locally by storing them in the journal of that site, e.g., the secondary journal 122. Updates are not stored in the secondary storage yet. As explained below, certain conditions must be met before updates are committed to storage, in order to ensure that the secondary sub-site is always consistent with a past state of the primary sub-site despite possible subsystem, devices, or communications failures between the two.

Thus, in contrast to the primary journals (e.g., 111, 117), journals at the secondary sub-site are used to cache updates in lieu of immediately applying them to the mirrored storage devices. The details of applying journaled updates to storage are discussed in greater detail below.

Timeout

Step 407 continues to run until step 409 determines that a "timeout" has occurred. Due to the nature of the universal timer, as exemplified by GPS receivers herein, timeouts occur simultaneously at the primary and secondary sites. In other words, affirmative answers to step 409 (at the secondary controllers) and with step 408 (at the primary controllers) occurs simultaneously. When step 409 detects a timeout, a number of things occur. As one consequence of timeout, step 423 advances to the next consistency group, and returns to step 404. As another consequence of timeout, each secondary sub-site in step 411 determines whether its secondary controller has received a confirmation message from its primary counterpart. In the illustrated embodiment, step 411 is performed by the secondary storage controllers communicating with each other over the links 138, 139, and 140.

No Confirmation

If all secondary controllers have not received confirmation messages, step 411 advances to step 413. Step 413 awaits the confirmation message, and if none is received, takes appropriate action such as (1) the secondary controller entering a suspended state, (2) initiating disaster recovery procedures, or (3) other applicable action.

Confirmation-Check for all Updates in Journal

On the other hand, if all secondary controllers have received their confirmation messages, step 411 advances to step 415. As discussed above, a confirmation message tells a secondary controller that the primary controller has transmitted all updates prior to the confirmation message's time stamp and sequence code; this enables the secondary controller to proceed to determine whether all updates were received, since it is known that they were in fact sent by the primary controller. Accordingly, in step 415 each secondary controller asks whether its secondary journal properly contains all updates of the current consistency group.

This determination may be made by each secondary controller determining whether its journal contains updates with all sequence codes between (1) the sequence code of the confirmation message of step 411 and (2) the sequence code ending the previous consistency group. If all updates are not present in every secondary journal, appropriate action is taken in step 417. This may occur, for example, if one or more updates are not received, corrupted, or otherwise missing. Generally, step 417 performs a recovery procedure in response to the missing updates from the secondary journal. As an example, recovery may involve requesting retransmission of the missing or corrupted updates from the source primary storage controller.

More Detailed Example

A more detailed explanation of step 415 is provided below, with aid of the journal contents shown in Table 3. In this example, when a secondary controller reviews its journal in step 415, it asks whether all entries are present between sequence codes 1001 and 1010. Since sequence codes 1006 and 1007 are missing, all updates are not present in the journal. Accordingly, step 417 is performed rather than step 419.

TABLE 3

Exemplary Journal Contents

| CONSISTENCY GROUP | ITEM SENT | TIME STAMP (SEC) | SEQUENCE CODE |
|---|---|---|---|
| (final part of) previous consistency group | confirmation message (ending previous consistency group) | 10.0 | 1001 |
| current consistency group | update contents | 10.1 | 1002 |
| | update contents | 10.3 | 1003 |
| | update contents | 10.7 | 1004 |
| | update contents | 10.8 | 1005 |
| | update contents | 11.0 | 1008 |
| | update contents | 11.9 | 1009 |
| | confirmation message (ending current consistency group) | 12.0 | 1010 |

Use of Time Stamps

As an additional error checking mechanism, step 415 may also review and evaluate time stamps of the journaled updates to verify presence of all updates in the current consistency group. If there is any disparity, the time stamps may be used in constructing a search, trace, audit trail or other debugging technique. However, the use of time stamps may be omitted completely without departing from the scope of this invention. In this case, step 415 is performed with sole reliance on checking sequence codes of the journaled updates.

Applying Secondary Journals

In contrast to the foregoing description and example, if every secondary controller finds all updates of the last consistency group in its journal, step 415 advances to step 419. In step 419, all secondary controllers apply their journaled updates to their respective storage devices. Application of journal entries involves copying the journaled data to the associated storage devices, thereby updating the storage devices. After step 419, the secondary controllers in step 421 return "acknowledge" messages to their respective primary controllers. In response, the primary controllers release the updates of the acknowledged consistency group from their respective journals (as described above in steps 412 and 416).

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for backing up data in a peer-to-peer backup system with multiple primary storage sub-sites each of the primary storage sub-sites having a counterpart secondary storage sub-site, each of the primary and secondary storage sub-sites being in communication with a universal timer, the method comprising:

each primary sub-site receiving one or more updates, storing the updates at the primary sub-site in an order, and transmitting each update along with a sequence code representing the update's order to the counterpart secondary sub-site;

each secondary sub-site receiving updates from its counterpart primary storage sub-site and storing the updates in a secondary journal of the secondary sub-site; and in response to expiration of a periodic interval of the universal timer, each primary sub-site sending its counterpart secondary sub-site a confirmation message identifying all updates sent in the expired interval;

each secondary sub-site checking for receipt of the confirmation message;

if confirmation messages were received by all secondary sub-sites, each secondary sub-site checking its secondary journal for presence of all updates identified by the confirmation message received by that secondary sub-site, and if each secondary journal contains all identified updates, each secondary sub-site committing the journaled updates to storage of the secondary sub-site.

2. The method of claim 1, the universal timer comprising a global positioning system.

3. The method of claim 1, where:

each confirmation message further includes a sequence code following a sequence code of the last transmitted update;

the secondary sub-site checking its secondary journal for presence of all updates identified by the confirmation message comprises:

determining whether the secondary journal contains updates with all sequence codes between the confirmation message and the last confirmation message received by the secondary sub-site.

4. The method of claim 1, the method further comprising:

the primary sub-site recording all transmitted updates in a primary journal;

responsive to the secondary sub-site committing the journaled updates, the secondary sub-site transmitting an acknowledge message to the primary sub-site;

responsive to receipt of an acknowledge message, the primary sub-site releasing the committed updates from its primary journal.

5. The method of claim 1, where the method further comprises:

after checking for receipt of the confirmation message, if no confirmation message has been received, the secondary sub-site performing at least one of the following actions: waiting for receipt of the confirmation message, entering a suspended state, or performing a predefined disaster recovery sequence.

6. The method of claim 1, the method further comprising, if all updates identified by the confirmation message are not present in the secondary journal, the secondary sub-site requesting its counterpart primary sub-site to retransmit the updates not present.

7. The method of claim 1, the method further comprising:
each primary sub-site generating a time stamp for each received update as of a time of storing the update at the primary sub-site according to the universal timer, where the transmission of each update further includes each update's time stamp.

8. A method for backing up data in data storage system including multiple primary storage controllers each of the primary storage controllers coupled to one or more primary storage devices, each primary storage controller having a counterpart secondary storage controller coupled to one or more secondary storage devices, one or more communication links between each primary storage controller and its corresponding secondary storage controller, each of the primary and secondary storage controllers being coupled to a universal timer, the method comprising:
each primary storage controller receiving one or more updates, storing the updates at the primary storage devices coupled to the primary storage controller in an order, and transmitting each update along with a sequence code representing the update's order to the counterpart secondary controller;
each secondary controller receiving updates from its counterpart primary controller and storing the updates in a buffer accessible by the secondary controller; and
in response to expiration of a periodic interval of the universal timer,
each primary controller sending its counterpart secondary controller a confirmation message identifying all updates sent in the expired interval;
each secondary controller checking for receipt of the confirmation message, and
if the confirmation messages have been received by all secondary controllers, each secondary controller checking its buffer for presence of all updates identified by the confirmation message, and if all updates in all buffers are present, committing the buffered updates to the secondary storage devices.

9. A signal-bearing medium tangibly embodying a program of machine-readable instructions executable by a digital processing apparatus to perform a method for backing up data in a peer-to-peer backup system with multiple primary storage sub-sites each of the primary storage sub-sites having a counterpart secondary storage sub-site, each of the primary and secondary storage sub-sites being in communication with a universal timer where each primary sub-site receives one or more updates, stores the updates at the primary sub-site in an order, and transmits each update along with a sequence code representing the update's order to the counterpart secondary sub-site, the method being performed by each secondary sub-site and comprising:
each secondary sub-site receiving the updates and sequence codes transmitted by its counterpart primary storage sub-site, and storing the updates in a second journal of the secondary sub-site; and
in response to expiration of a periodic interval of the universal timer, each secondary sub-site checking for receipt of a confirmation message sent by its counterpart primary sub-site, the confirmation message identifying all updates sent in the expired interval; and
if confirmation messages were received by all secondary sub-sites, each secondary sub-site checking its secondary journal for presence of all updates identified by the confirmation message received by that secondary sub-site, and if each journal contains identified all updates, each secondary sub-site committing the journaled updates to storage, the secondary sub-site.

10. The medium of claim 9, the universal timer comprising a global positioning system.

11. The medium of claim 9, where:
each confirmation message further includes a sequence code following a sequence code of the last transmitted update;
the secondary sub-site checking its secondary journal for presence of all updates identified by the confirmation message comprises:
determining whether the secondary journal contains updates with all sequence codes between the confirmation message and the last confirmation message received by the secondary sub-site.

12. The medium of claim 9, the method further comprising:
responsive to the secondary sub-site committing the journaled updates, the secondary sub-site transmitting an acknowledge message to the primary sub-site.

13. The medium of claim 9, where the method further comprises:
after checking for receipt of the confirmation message, if no confirmation message has been received, the secondary sub-site performing at least one of the following actions: waiting for receipt of the confirmation message, entering a suspended state, or performing a predefined disaster recovery sequence.

14. The medium of claim 9, the method further comprising, if all updates identified by the confirmation message are not present in the secondary journal, the secondary sub-site requesting its counterpart primary sub-site to retransmit the updates not present.

15. The medium of claim 9, the method further comprising:
along with each updates received from the counterpart primary storage sub-site, each secondary sub-site receiving from its counterpart primary sub-site time stamps representing times of the primary sub-site storing each update according to the universal timer.

16. A data storage system, comprising:
multiple primary storage sub-sites, each primary storage sub-site including a primary data storage and a primary controller;
for each primary storage sub-site, a counterpart secondary storage sub-site, each secondary storage sub-site including a secondary data storage, a secondary journal, and a secondary controller;
one or more communications links interconnecting each primary storage sub-site to its counterpart secondary sub-site;
one or more communications links interconnecting the secondary storage sub-sites; and
a universal timer providing a common time reference signal to all of the primary and secondary storage sub-sites;
where the primary and secondary sub-sites are programmed to perform a method to backup data comprising:
each primary controller receiving one or more updates, storing the updates at the primary storage in an order, and transmitting each update along with a sequence code representing the update's order to the counterpart secondary controller;

each secondary controller receiving updates from its counterpart primary controller and storing the updates in its secondary journal; and in response to expiration of a periodic interval of the universal timer,
each primary controller sending its counterpart secondary controller a confirmation message identifying all updates sent in the expired interval;
each secondary controller checking for receipt of the confirmation message;
if confirmation messages were received by all secondary sub-sites, each secondary controller checking its secondary journal for presence of all updates identified by the confirmation message received by that secondary controller, and if each secondary journal contains all updates, each secondary sub-site committing the journaled updates to its secondary storage.

17. The system of claim 16, the universal timer comprising a global positioning system.

18. The system of claim 16, where:

each confirmation message further includes a sequence code following a sequence code of the last transmitted update;

the secondary controller checking its secondary journal for presence of all updates identified by the confirmation message comprises:
determining whether the secondary journal contains updates with all sequence codes between the confirmation message and the last confirmation message received by the secondary sub-site.

19. The system of claim 16, where each primary sub-site further includes a primary journal, and where each primary and secondary sub-site is programmed such that the backup method further comprises:

each primary sub-site recording all received updates in its primary journal;

responsive to the secondary sub-site committing the journaled updates, the secondary controller transmitting an acknowledge message to its counterpart primary controller;

responsive to receipt of an acknowledge message, the primary sub-site releasing the committed updates from its primary journal.

20. The system of claim 16, each secondary sub-site being programmed such that the backup method further comprises:

after checking for receipt of the confirmation message, if no confirmation message has been received, the secondary sub-site performing at least one of the following actions: waiting for receipt of the confirmation message, entering a suspended state, or performing a predefined disaster recovery sequence.

21. The system of claim 16, each secondary sub-site being programmed such that, if all updates identified by the confirmation message are not present in the secondary journal, the secondary controller requests its counterpart primary controller to retransmit the updates not present.

22. The system of claim 16, each primary sub-site being programmed such that the backup method further comprises:

each primary sub-site generating a time stamp for each received update as of according to the universal timer a time of storing the update at the primary sub-site according to the universal timer, where the transmission of each update further includes each update's time stamp.

* * * * *

UNITED STATES PATENT AND TRADEMARK OFFICE
CERTIFICATE OF CORRECTION

PATENT NO. : 6,148,383
DATED : November 14, 2000
INVENTOR(S) : Micka et al.

It is certified that error appears in the above-identified patent and that said Letters Patent is hereby corrected as shown below:

Column 14, claim 9,
Line 1, change "identified all" to -- all identified --.

Column 14, claim 9,
Line 3, change "storage," to -- storage of --.

Column 14, claim 15,
Line 38, change "updates" to -- update --.

Column 16, claim 22,
Line 29, change "as of according to the universal timer" to -- as of --.

Signed and Sealed this

Ninth Day of October, 2001

Attest:

NICHOLAS P. GODICI
Attesting Officer    Acting Director of the United States Patent and Trademark Office